(No Model.)
P. W. REINSHAGEN.
TURRET LATHE.
No. 261,383.   Patented July 18, 1882.
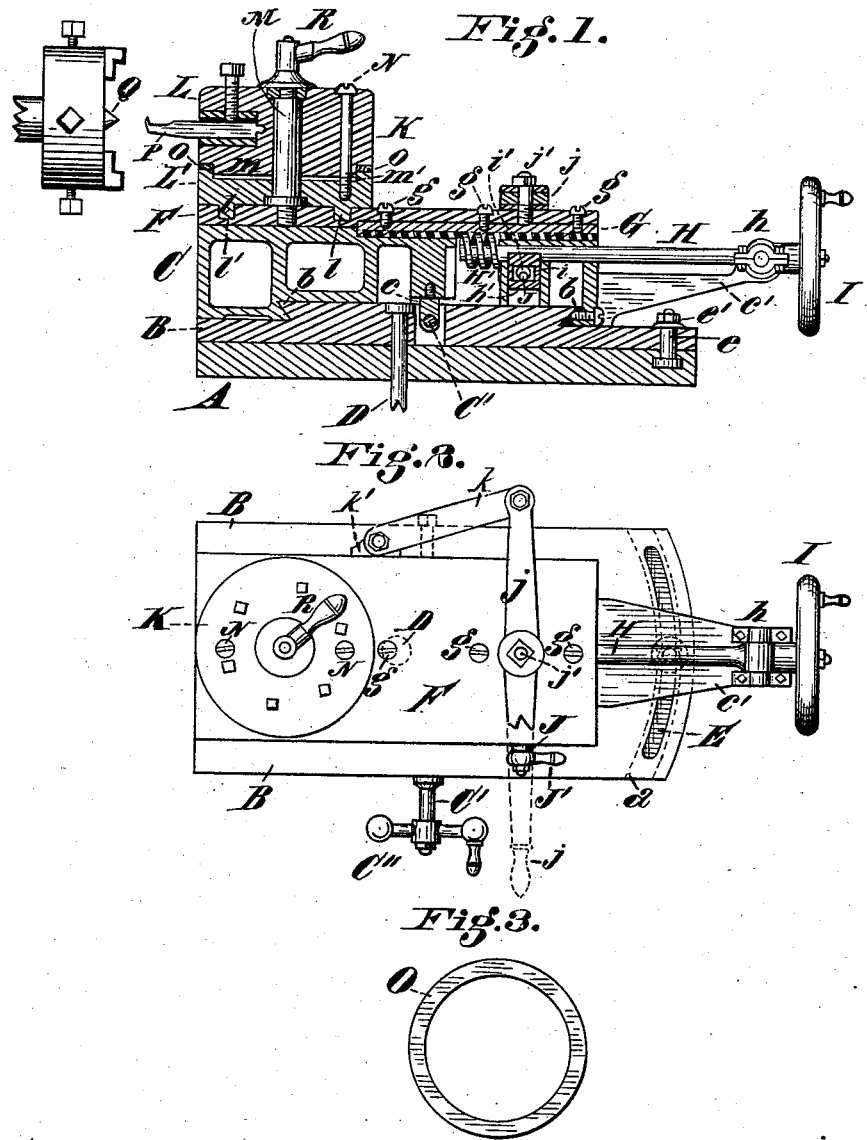

UNITED STATES PATENT OFFICE.

PETER W. REINSHAGEN, OF CINCINNATI, OHIO.

TURRET-LATHE.

SPECIFICATION forming part of Letters Patent No. 261,383, dated July 18, 1882.

Application filed March 6, 1882. (No model.)

*To all whom it may concern:*

Be it known that I, PETER W. REINSHAGEN, a citizen of the United States, and a resident of Cincinnati, in the county of Hamilton and State of Ohio, have invented certain new and useful Improvements in Turret-Lathes, of which the following is a specification.

My invention relates to improvements in that class of lathes known as "monitor" or "turret" lathes.

Heretofore this class of lathes has been so constructed that no means were provided to compensate for the wear of the mandrel or live-spindle, which in use by such wear would become "out of center" with the cutting tool or tools, thereby destroying the concentricity of the cutting and boring mechanism and affecting the accurate working of the machine.

To overcome this difficulty is the principal object of my invention.

It consists in the first part in making the revolving turret in which the various cutting and boring tools are mounted in two or more parts in vertical array, and introducing between these divisions annular rings of metal or other suitable material, to bring said tools in the desired vertical plane or relation with the mandrel or live-spindle by removing or replacing one or more of said filling-rings, as the case may be, and then adjustably securing the sections of the turret together by bolts or screws.

The invention further consists of certain constructions and combinations of parts for adapting the cutting-tools to cut taper or bevel surfaces and for manipulating the slide which carries the turret, all of which will be hereinafter described in detail, and pointed out in the claims.

The improvements are clearly illustrated in the accompanying drawings, in which Figure 1 is a longitudinal central section of that portion of a turret-lathe embodying my invention. Fig. 2 is a plan view of the same, but omitting that part of Fig. 1 in which the live-spindle and tool are shown. Fig. 3 is a plan view of a filling-ring.

A represents the bed, which is mounted and slides on the shears of the mounting-frame, which I have not shown.

B represents a swinging bed or carriage, mounted on bed A, and provided with transverse guides $b\ b$, on which the turret-carriage C slides.

D is a vertical center-bolt, passed through swinging bed B and bed A. It is shown broken off, being secured to the shears by a swivel-nut.

$a$ is a curved channel or groove, made inverted-T shape in cross-section in the upper tail end of bed A, in which is inserted a headed bolt or screw, $e$, passing upward through a segmental slot, E, made in the rear end of swinging bed B, and securing by a nut, $e'$, the said bed B at any desired angle on bed A within the limit of slot E.

C' is a transverse screw-shaft passing through bed B and pendent journal-bracket $c$ on the carriage C, by which carriage C is moved laterally on guides $b\ b$. It is provided with a handle, C''. I provide these means of swiveling and sliding the carriages B C for adapting the lathe to cutting taper or bevel surfaces or bore.

F represents a slide, upon which the turret-head is mounted.

G is a rack-bar secured by screws $g$ on the under side of slide F from its tail end a portion of its length forward.

H is a horizontal shaft, mounted near its rear end in a pivoted journal-box, $h$, on bracket-arm $c'$, and near its other end in a vertically-adjustable journal-box, $h'$.

H' is a worm or screw-thread constructed at the forward end of shaft H, which worm engages the rack G and reciprocates longitudinally the turret-slide F.

I is a hand driving-wheel at the rear end of shaft H.

The worm H' may be adjusted to and from engagement with rack G by raising or lowering its journal-box $h'$. This is accomplished by constructing box $h'$ with an opening or slot, $i$, in which moves a cam or eccentric, $i'$, mounted on a shaft, J, which is operated by a handle, J', on the outside of carriage C.

The rack-and-worm mechanism, as hereinbefore mentioned, is provided to adapt the lathe to that class of work in which the slow movement of the cutting-tools is desired. When it is desired to perform the work with greater speed I provide, in addition to the said rack-and-worm mechanism, which is first disconnected, a swinging hand-lever, $j$, pivoted at $j'$ to the upper face of slide F, and connecting by a link, $k$, at its fulcrum end with a lug or ear, $k'$, on the carriage C. These levers, handles, and hand-wheels for operating the different parts of the machine are all so arranged that they can be readily adjusted by the operator from one side of the lathe.

K is the turret-head, made in two or more parts, L L', and revolving on a center-bolt or upright shaft, M, which is screwed into the slide F. The lower section, L', is provided on its bottom with an annular flange, $l$, which enters and revolves in the annular recess $l'$, made in the upper face of slide F. The next or upper section, L, is flanged at $m$, which flange enters a recess or concavity, $m'$, made in the upper face of the lower section, L'.

N N are screws to adjustably secure the several sections L L' of the turret-head K together, so as to permit their being separated, and a filling-ring or washer, O, is introduced between them when it becomes necessary to raise the upper head or section, L, in which the tools P are mounted, to bring it in the proper relation or concentric plane with the mandrel or live-spindle Q. It is obvious that one or more of these filling-rings may be used, if necessary.

R is a hand-clamp screwed on the top of shaft or spindle M for securing the turret-head in any desired position and assisting in holding the several sections L L' together.

I claim—

1. In a turret-lathe, the combination, substantially as hereinbefore described, of a rotary turret-head composed of separate sections arranged vertically one above the other, a removable and replaceable filling-ring arranged intermediate the said sections, and adjusting-screws detachably connecting the sections together, whereby the height of the tool carried by the turret-head can be adjusted, essentially as set forth.

2. The combination of the bed provided with the bolt $e$, the swinging carriage B, provided with the segmental slot E, and connected with the bed by the center-bolt D, the horizontal slide F, carrying the rotary turret-head, and devices for adjusting the slide longitudinally, substantially as shown and described.

3. The combination of the bed A, having the curved groove $a$, the carriage B, swiveled on a center-bolt, D, and provided with the segmental slot E, the bolt $e$, having its head arranged in the groove of the bed and projecting through the slot in the carriage, the carriage C, transversely adjustable on the swiveled carriage, and the rotary turret-head mounted on the slide F, carried by the transversely-adjustable carriage, substantially as described.

4. In a turret-lathe, the combination of the supporting-bed A, the longitudinal slide F, carrying the turret-head and provided on its under side with a rack, G, the horizontal worm-shaft H H', pivoted at its rear portion, the vertically-adjustable journal-box $h'$, supporting the forward end of the worm-shaft, means for lowering the journal-box to tilt the worm-shaft and disengage its worm from the rack on the slide, and devices for shifting the slide when the worm is disengaged therefrom, substantially as described.

5. In a turret-lathe, the combination of the supporting-bed A, the longitudinal slide F, carrying the turret-head and provided on its under side with a rack, G, the horizontal worm-shaft H H', the vertically-adjustable journal-box $h'$, supporting the forward end of the worm-shaft, the transverse rock-shaft J, having a cam or eccentric to depress the forward portion of the worm-shaft and disengage it from the rack, and lever mechanism for shifting the slide when the worm is so disengaged, substantially as described.

In testimony whereof I have hereunto set my hand in the presence of two subscribing witnesses.

PETER W. REINSHAGEN.

Witnesses:
JOHN E. JONES,
J. H. CHARLES SMITH.